Figure 1:
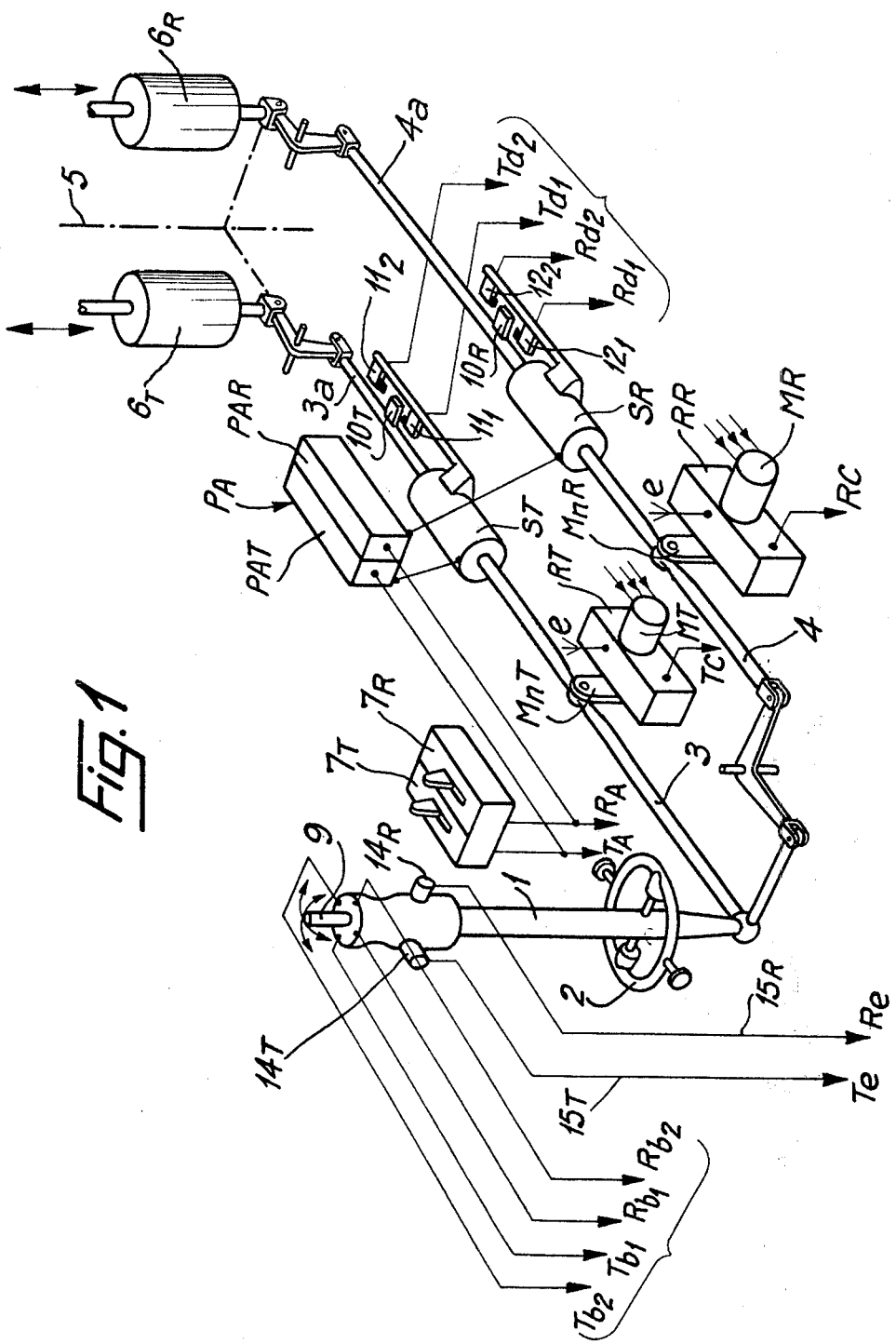

United States Patent [19]
Fleury et al.

[11] 3,981,461
[45] Sept. 21, 1976

[54] SYSTEM FOR CONTROLLING THE POSITION OF THE ANCHORAGE POINT OF THE PILOTING CHANNEL OF AN AIRCRAFT

[75] Inventors: Gérard Fleury, Marseille; Marc Camille Alexandre Fourcade, St-Victoret, both of France

[73] Assignee: Societe Nationale Industrielle Aerospatiale, Paris, France

[22] Filed: June 2, 1975

[21] Appl. No.: 582,674

[30] Foreign Application Priority Data
June 6, 1974 France .......................... 74.19532

[52] U.S. Cl. ........................... 244/17.13; 244/83 G
[51] Int. Cl.² ..................................... B64C 27/70
[58] Field of Search ............ 244/17.13, 83 D, 83 G, 244/83 J, 77 F, 77 M, 77 SE, 77 D, 181, 196, 197

[56] References Cited
UNITED STATES PATENTS

| | | | |
|---|---|---|---|
| 2,961,201 | 11/1960 | Sedgfield et al. .................. | 244/77 F |
| 3,051,418 | 8/1962 | Ramsey .............................. | 244/83 G |
| 3,570,788 | 3/1971 | Cox .................................... | 244/77 F |
| 3,584,814 | 6/1971 | Murphy ............................. | 244/77 D |
| 3,750,984 | 8/1973 | Moutiet et al. .................... | 244/83 D |

Primary Examiner—Trygve M. Blix
Assistant Examiner—Barry L. Kelmachter
Attorney, Agent, or Firm—Karl W. Flocks

[57] ABSTRACT

The invention relates to the automatic stabilisation of aircraft, inter alia helicopters.

The position of the anchorage point of piloting channels, inter alia for roll and pitch, is determined by trim motors disposed inside mechanical relays. On the basis of data received from a control column and from an automatic pilot which acts on servo controls, a logic arrangement controls parallel electronic switches which by way of parallel lines permit energisation of the trim motors in a motor priority order determined by action on the bases of the electronic switches.

4 Claims, 2 Drawing Figures

SYSTEM FOR CONTROLLING THE POSITION OF THE ANCHORAGE POINT OF THE PILOTING CHANNEL OF AN AIRCRAFT

This invention relates to a system for controlling the position of the anchorage point of the piloting channel of an aircraft.

An aircraft can of course be piloted or kept stable in flight either manually or through the agency of automatic devices which can be used either for piloting or just for stabilisation alone, inter alia in the case of helicopters.

In a known system of combined manual and automatic piloting, a control channel is provided which can act on a control surface of an aircraft (or its piloting equivalent, e.g. in the case of helicopters) and which provides a manual control and a ram type servo control in that order, connection between the two forms of control being provided by a moving element which can be locked in position and which will hereinafter be called a "mechanical relay." The same when locked serves as an anchorage point to the servo control for action on the control surface; when released the mechanical relay permits manual piloting via the ram which can for this purpose itself be locked, for instance, in its central position. Preferably, locking of the mechanical relay is of the kind using a resilient force limiter - i.e., the pilot can at any time, without needing to fully release the relay, act manually on the control surface by overcoming the resistance of the force limiter. The minimum hand or foot force required on a lever or wheel for operating the control surface is therefore determined by the resilient force of the limiter, such force providing an artificial reaction for the pilot (transparent piloting).

Action on the position in which the relay is locked is also possible by means of a manually or automatically controlled trim motor, the function of which is to determine the stationary position of the anchorage point so as to provide a midposition centering of the action of the servo control, to ensure that the same normally never reaches the end of its travel in either direction, such travel usually being less than the total travel of the manual control.

One such mechanical relay interposed between a manual control and a servo control is disclosed, for instance, by the Applicants' U.S. patent specification Ser. No. 252,292, now U.S. Pat. No. 3,750,984 wherein the moving member of the relay is a crank pin which is secured to a rotating shaft and to a finger parallel thereto and which is normally disposed in extension of a second finger rigidly secured to a locking device, the fingers being engaged between the two jaws of a spring clamp, the same rotating with the shaft, which is the force limiter. In a preferred embodiment disclosed in such U.S. Pat. No. 3,750,984, the second finger is rigidly secured to a quadrant rack meshing with a gear rigidly secured to a second shaft which can, as required, be released or locked by a brake or driven by the trim motor to alter the position of the second finger. One of the jaws carries a microcontact and the other the element for actuating the microcontact. The microcontact, which releases automatically when the jaws separate — i.e., when the crank pin is moved against the resilient force of the clamp in either direction — controls the operation of the automatic pilot facility.

Each of the trim motors in a channel can normally be controlled by the pilot through the agency of contacts provided for operation by him, inter alia on the control column. The motors can also be controlled automatically by the servo controls which come under the automatic pilot or the stabiliser reaching the end of their travel in either direction, for as already stated these servo controls, which serve to maintain the attitude imparted to the aircraft by manual control, have a relatively short travel and can be moved rapidly to their end position in either direction, for instance, when the aircraft experiences violent gusting, in which case their action is substantially unilateral.

Basically, and more particularly in the case of a helicopter, to simplify the pilot's work, roll and pitch stabilisation of the attitude of the aircraft is automatic. As will be seen hereinafter, the invention is very useful in such cases.

A control chain with automatic piloting can also be devised for keeping the aircraft on course and for descents and landing ground approaches.

Consequently, considerable data in addition to the data provided by the pilot can be transmitted simultaneously to act on the trim motors. It is of course possible to provide as many data processing systems as there are trim motors and to supply each system merely with the data concerning the corresponding channel. Any such system has first cost and weight disadvantages, while the lack of co-ordination between trimming action in the various control channels may distrub operation when either a human pilot or an automatic stabiliser or automatic pilot requires incompatible actions to be performed simultaneously.

The invention obviates these disadvantages and is based on the following considerations.

Trimming action need never be instantaneous and can be delayed. Also, in cases where a number of trim motors have to be operated, an order of priority for trim motor operation can be selected. For instance, in cases where the piloting and stabilising facilities act only on roll and pitch, pitch trim preferably has priority over roll trim. Where action is possible in respect of the three physical axes of direction of the aircraft, namely roll, pitch and yaw, yaw trim, which stabilises the aircraft's track should have priority.

According to the invention, a trim motor belonging to a channel for controlling a control surface is energised via a circuit arrangement controlled by a logic system integrating the manual and automatic data, the logic system acting in an electronic switch to energise the main electrodes thereof to energise the motor to run in one particular direction and to energise the switch control electrode to make the switch conductive.

It then becomes possible to separate the conditions motivating trim motor intervention from conditions determining the extent of the movement provided by the trim motor — i.e., the time for which the same runs.

More particularly, with such a system sequential energisation of the various trim motors is possible, for all the trim motors associated with all the controlled channels for control surfaces are preferably energised in parallel from a circuit arrangement controlled by a first logic arrangement integrating the manual and automatic data to start a motor running and determine the direction in which it runs, by way of a corresponding number of circuit branches each comprising an electronic switch, the switches being controlled by a second logic arrangement integrating the data, the two logic arrangements outputting signals in the motor priority order by inhibiting the passage of non-priority signals when priority signals are present.

Advantageously, the trim motors are step-by-step motors and the energising circuit arrangement comprises a pulse-generating clock and a ring backwards and forwards counter for energising the motor and determining its direction of rotation.

The brake locking the moving member of the mechanical relay can be an electromagnetic disc brake or it can be the step-by-step motor itself if the same is so devised that the magnetic field causing the rotor to rotate cancels the field produced by the permanent magnets of the brake and thus permits the motor to run without any further action being needed.

Hereinafter, to simplify matters consideration will be given merely to the case of simultaneous roll and pitch stabilisation.

Figure 2:
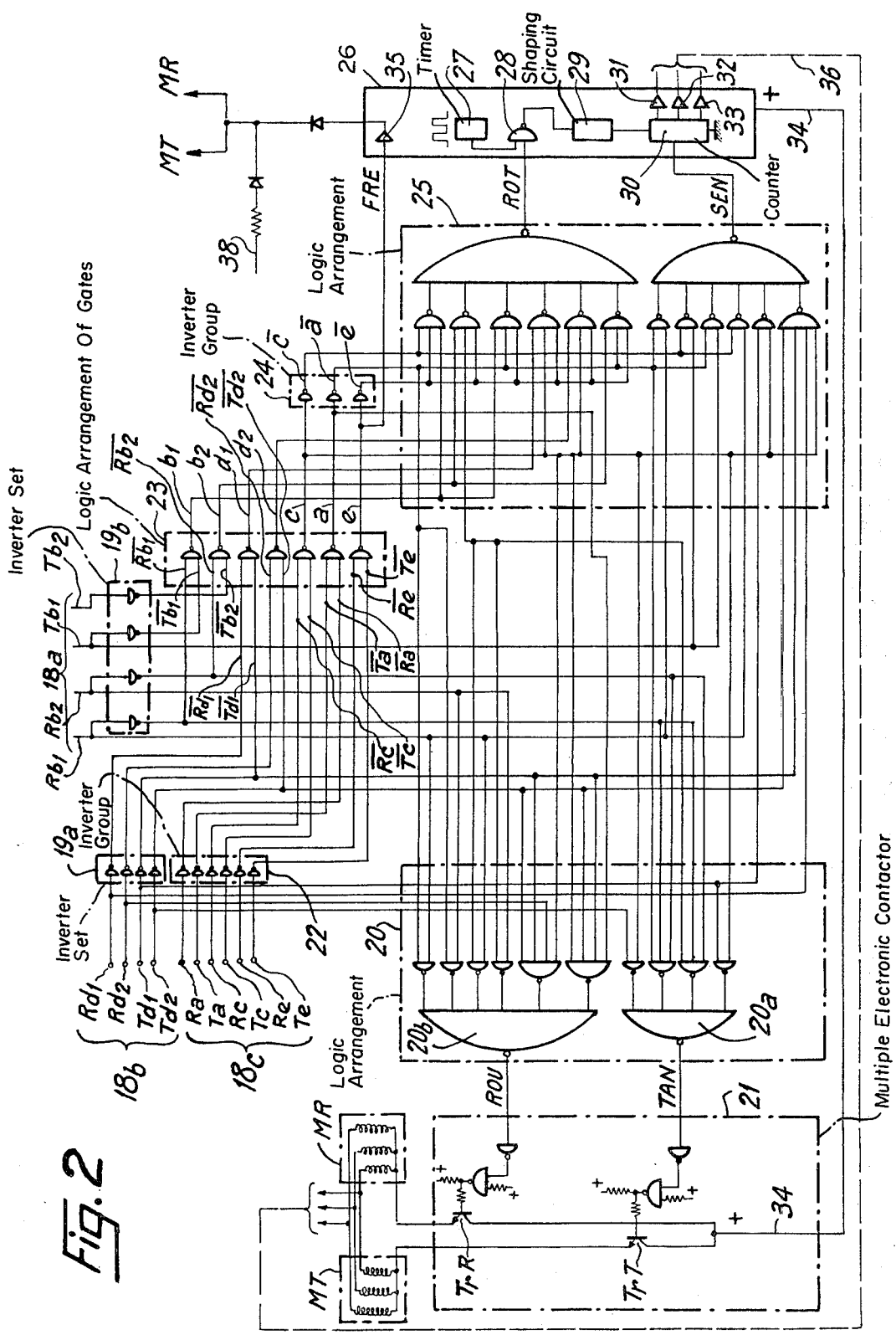

An understanding of how the invention can be carried into effect can be gathered from the accompanying drawings wherein:

FIG. 1 is a partial and perspective diagrammatic view of a helicopter piloting station, and FIG. 2 is the electric circuit diagram for control of the trim motors shown in FIG. 1.

Referring to FIG. 1, a control column 1 in a universal mounting 2 provides pitch control, via linkage 3, and roll control, via linkage 4, of a wobble plate which acts on the incidence of the craft rotor blades; FIG. 1 shows axis 5 of the rotor mast.

Linkages 3, 4 are pivoted to crank pins MnT and MnR of mechanical relays RT and RR devised e.g. as disclosed by U.S. Pat. No. 3,750,984 of Mouttet et al issued Aug. 7, 1973. In other words, the crank pin can, through the agency of means (not shown in detail) in the relays, be free or electromagnetically locked, through the agency of a resilient force limiter essentially consisting of a spring (spring 4 in FIGS. 3–5) shown in U.S. Pat. No. 3,750,984 referred to above, in a position imparted to the crank pin by the trim motor MT or MR of the corresponding relay. A crank pin thus locked serves as an anchorage point for a servo control ram (ST and SR respectively) under the control of automatic pilot PA which can be in two parts — a pitch part PAT controlling ram ST, and a roll part PAR controlling ram SR. Action on the linkage portions 3a, 4a which are disposed beyond the rams may therefore arise either from action on the control column or from a servo control action. The movement of these portions is transmitted to the wobble plate by servo control rams 6T and 6R which are substantially irreversible and which provide the required power.

In a known construction of this kind the attitude of the aircraft is determined by action of the pilot of the control column and is maintained by the limited-travel servo control rams ST and SR which constantly tend to return the aircraft to its attitude thus set.

However, manual piloting is still possible either by applying sufficient force to the control column to overcome the resistance of the resilient force limiters — in which case the pilot becomes aware of the resilient reaction, which increases with the amplitude of the movement — or by releasing the pins MnT and MnR.

In either case the automatic pilot PA can be operative or inoperative, for since the movement it can instruct the rams ST and SR to perform are reduced, action of the automatic pilot PA does not disturb the action of the control column. The automatic pilot can be cut into operation by respective switches 7T and 7R for the two pitch and roll control "panels."

Since the travel of the servo controls is so short, they must be properly centered if they are to act effectively on both sides of the selected midposition. Since the same is defined by the mid-position of each of the pins MnT and MnR, the trim motors MT and MR should operate appropriately to alter such position if necessary.

To control The latter motors the piloting station comprises the following elements:

Disposed at the top of the control column and adapted to be operated by the pilot's thumb is a pivoting lever type contactor 9 associated with four contacts in a cross for controlling rotation of motors MT and MR in either direction. Hereinafter, rotation of motors MT and MR in the direction corresponding to a forward movement of the corresponding crank pin will be called "forwards running" and the opposite direction will be called "backwards running." When operative the latter contacts provide the logic signal 1.

The output conductors of the contacts therefore provide the following logic signals for manual control of the trim motors:

| motor MT | forwards running | Tb1 |
|---|---|---|
|  | backwards running | Tb2 |
| motor MR | forwards running | Rb1 |
|  | backwards running | Rb2 |

The parts 3a, 4a carry tappets or the like which in the case of the tappet 10T move between contacts $11_1$ and $11_2$ and which in the case of the tappet 10R move between contacts $12_1$ and $12_2$; the latter contacts are disposed on the cylinders of the servo actuators and the tappets are disposed on the servo pistons.

As previously, therefore, the following logic signals from either contacts $11_1$-$11_2$ or $12_1$-$12_2$ being operated by tappet 10T or 10R, such circuit means for generating logic signals being well known in the art, i.e., said contacts and tappets being conductive and inserted in open circuits comprising suitable electric current sources, are provided for automatic control of the trim motors;

| motor MT | forwards running | Td1 |
|---|---|---|
|  | backwards running | Td2 |
| motor MR | forwards running | Rd1 |
|  | backwards running | Rd2 |

Also disposed on control column 1 for operation by the pilot's fingers are two push-button contacts 14T and 14R which by way of lines 15T and 15R control the electromagnetic release of the crank pins and motors of relays RT and RR and therefore output the signals Re and Te respectively, the latter signals being 1 when the brakes are released. Contacts 14T and 14R release the crank pins because they are disposed to close, when actuated, electric supply circuits in which electromagnetically operated means are inserted for releasing said crank pins.

In practice and to simplify pilot operations the two contacts 14T and 14R can be controlled by a single push button to give control of the braking function in the two channels.

The relays RT and RR contain internally a normally closed microcontact which opens in response to action on the control column but without releasing the trim motor brake, for as already described the brake pin is locked by a resilient clamp acting as a force limiter, and the clamp arms separate from one another and open the microcontacts in whatever direction any of the crank pins MnT or MnR is acted on.

The respective logic signals $$Rc \quad Tc$$

are therefore obtained; they are 1-signals in the absence of pilot action on the control column (for rolling or pitching) or 0-signals otherwise.

The contacts 7T and 7R also provide logic signals $$Ta \text{ and } Ra$$

which are 1-signals if the corresponding channel is engaged and 0-signals otherwise.

The various signals provided are input to the logic facility shown in FIG. 2. The input terminals for the different signals are distributed in three groups — 18a for the manual trim signals, 18b for automatic-pilot trim signals and 18c for the various signals of manual origin. Signals having an 1 or 2 index i.e., Rd1 and Rd2, Rb1 and Rb2, etc., and serving to start a trim motor to either direction of running are inverted by inverter sets 19a and 19b. The other six input signals determining the operating conditions of the trim motors are inverted by an inverter group 22 and fed in parallel to a logic arrangement 23 embodied by NOT-AND gates. On the basis of the reciprocals of all the input signals taken in pairs with re-grouping of pairs of like signals, the arrangement 23 in the circuitry shown in FIG. 2 prepares the following seven signals which have a value 1 when operative:

$b_1$ manual request for forward running
$b_2$ manual request for backward running
$d_1$ automatic request for forward running
$d_2$ automatic request for backward running
$c$ action by human pilot on control column
$a$ automatic pilot in operation
$e$ release of brake.

To suit the needs of the logic control system, some of the signals are also inverted by the inverter group 24. These direct or inverted signals go to logic arrangement 20 and to logic arrangement 25.

Logic arrangement 20 comprises two logic systems 20a and 20b outputting signals TAN and ROU respectively. Since the signal TAN must have priority, the logic system 20b considers signals requesting roll trim action (motor Tr) only when no signal is present requesting pitch trim action.

The signals TAN and ROU are signals controlling the base of power transistors TrT and TrR of a multiple electronic contactor 21 providing parallel energisation, in a manner to be described hereinafter, of step-by-step motor MR and MT respectively.

Consequently, the logic arrangement 20, which receives all the trim motor instruction signals (including those for the required directions of rotation) and the associated motor start signals, merely determines, in the instructed priority order, that or those of the motors to be consecutively energised by contactor 21. The order in which the motors are consecutively engaged results from logical equations TAN and ROU discussed later herein.

The logic arrangement 25 provides three signals:

| the direction of rotation signal | SEN |
| the start signal | ROT |
| the brake signal | FRE |

In the unit 26 comprising elements 27-31 and 35, for processing the three latter signals the signal ROT goes, together with the recurrent signal of a clock or a timer 27, to AND-gate 28. The output signal therefrom goes first through a shaping circuit 29 and is then converted into a recurrent train of rectangular signals which go to the ring backwards and forwards counter 30 whose counting direction is determined by the value (1 or 0) of the signal SEN (1 for forward running and 0 for backward running). From the counter the recurrent pulses go through amplifiers 31, 32, 33 for parallel energisation via line 36 of the three groups of windings of each of the motors MR and MT. The parallel energisation circuit branches thereof are connected via the parallel transistors TrT and TrR to a common supply line 34.

Signal FRE is amplified in 35 and is then supplied to the electromagnetic brakes of motors MT and MR, such brakes possibly forming part of the motors themselves. The signal FRE is operative more particularly in the case of manual operation, the energisation of the motors MT and MR releasing the brake automatically. In any case, auxiliary energisation 38 releases the brakes to make manual piloting possible in the event of a defect in the logic facility.

In a system of this kind the rate of response of the motors MT and MR (in that priority order) depends upon the frequency of the pulses of the timer or clock 27; the frequency is chosen in accordance with the kind of aircraft using the facility. The logic arrangements 20, 25 are prepared from KARNAGUH tables simplified by the use of DeMorgan's logical algebra theorems.

To devise systems corresponding to the TAN output and ROU output respectively in the logic arrangement 20, a KARNAGUH table is prepared for each of them. All the possible values of the four manual signals (contactor 9) and the signal $c$ (deliberate column action) are plotted on one side of the table, and all the possible values of the automatic signals (tappets 10R, 10T and associated contacts) and of the signal $a$ (automatic pilot engaged) are plotted on the adjacent side of the table. Each box is then marked either with 1, if the corresponding motor is to run, or with 0 if it is not to run and with and elimination notation in all other cases.

More particularly, in the case of the roll table the 0 signal is marked in all the boxes corresponding to a positive pitch trim order.

The logical equations to be satisfied can be derived from such tables by grouping possibilities of the same order, and the equations are then converted by use of the Morgan theorems so that they can be used with a particular kind of gate, e.g. in the present case the NOT-AND gates and the inverters.

The following pitch and roll values can be found in this way:

$$\text{TAN} = \overline{\overline{Td2\,c}\,.\,\overline{a\,Rb1\,Rb2}\,.\,\overline{c\,Rb1\,Rb2}\,.\,\overline{Td1\,c}}$$

and $$\text{ROU} = \overline{\overline{\overline{c\,Rb1}\,.\,\overline{a\,Rb2}\,.\,\overline{c\,Rb1}\,.\,\overline{c\,Rb2}\,.\,\overline{Td2\,Td1\,Rd2}}\atop{\overline{c\,a\,Td2\,Td1\,c}}}$$

As a check on the drawings will show, the two parts of the logic facility 20 satisfy these equations.

In the case of the logic system 25 the KARNAGUH tables correspond to the signals ROT and SEN. The first contains horizontally all the possible values of the four signals $b1, b2, d1, d2$ (forwards or backwards running, manual or automatic control) and vertically all the values of the three signals $a, c, e$ (channels engaged, pilot operating, brake). The second is prepared like the tables for the signals TAN and ROU — i.e., with the same values of the input signals on adjacent sides.

Following the same procedure — i.e., putting 1 or 0 in the boxes of the second table for forward or backward running of the motor and putting 1 or 0 in the boxes of the first table for running or non-running of the motor and then eliminating impossible situations — the result obtained after simplification is:

$$\text{ROT} = \overline{\overline{b1\,\overline{c}\,\overline{e}}\,.\,\overline{b2\,\overline{c}\,\overline{e}}\,.\,\overline{b1\,\overline{a}\,\overline{e}}\,.\,\overline{d1\,c\,\overline{e}}\,.\,\overline{d2\,c\,\overline{e}}\,.\,\overline{b2\,\overline{a}\,\overline{e}}}$$

and $$\text{SEN} = \overline{\overline{\overline{a\,Rb1}\,.\,\overline{c\,Tb1}\,.\,\overline{a\,Tb1}\,.\,\overline{c\,Rb1}\,.\,\overline{Td1\,c}\,.\,\overline{Td2\,Td1\,Rd1\,c}}}$$

As previously, the former circuit arrangements shown for the logic system 25 satisfy these equations.

The end result is that, with the system according to the invention, the trim motors start in the selected priority order either alone or consecutively and provide continuous adjustment of the middle position of the servo control to give it maximum freedom on either side thereof, the adjustment being initiated either in response to the indications of the automatic pilot or to the attitude variations called for by the human pilot.

The invention is of use for aircraft in general and more particularly for helicopters having either an automatic pilot or an automatic stabilising system.

We claim:

1. A System for controlling the position of at least one anchorage point of an aircraft piloting channel, with a manual control, a servo control, a moving element inserted as an anchorage point between said manual control and said servo control, and a trim motor for positionally controlling said moving element, said position controlling system comprising an electronic switch having main electrodes inserted in the supply circuit of said trim motor and a control electrode, and a first and a second logic arrangement connected for processing the manual and automatic data coming from the piloting channel, said first logic arrangement being operative to energise the main electrodes of the said switch for having said trim motor running in a particular direction, and said second logic arrangement being operative to energise the control electrode of the said switch.

2. A system according to claim 1 for controlling the respective positions of a number of anchorage points associated with at least two aircraft piloting channels, with a same number of electronic switches, having main electrodes inserted in the respective supply circuits of the trim motors of said piloting channels and connected to said first logic arrangement to be energised thereby, and control electrodes, the second logic arrangement comprising a same number of outputs, each connected to the control electrode of one of the said switches, whereby operational priority order of said trim motors is determined by said second logic arrangement.

3. A control system according to claim 2, wherein means are further provided for deriving signals for determining the two possible directions of trim motor rotation from the piloting channel data, the first logic arrangement comprises a first output for a motor start control signal, and a second output for a direction of motor rotation signal, and the second logic arrangement comprises an input for said direction of trim motor rotation, determining signal, and an output for a control signal for one of the electronic switches.

4. A control system according to claim 3, comprising means for generating a recurrent pulse signal, step-by-step trim motors, a coincidence gate having inputs for said motor start signal and for said recurrent pulse signal, and a ring backwards and forwards counter having a control input for said direction of motor rotation determining signal, said ring backwards and forwards counter being connected to the output of said coincidence gate and being operative to energise the respective windings of said step-by-step trim motors in parallel.

* * * * *